(12) United States Patent
Scott et al.

(10) Patent No.: US 11,567,511 B1
(45) Date of Patent: Jan. 31, 2023

(54) AFTER HOURS PACKAGE PICK UP FROM A ROBOT

(71) Applicant: Amazon Technologies, Inc., Seattle, WA (US)

(72) Inventors: Sean M. Scott, Sammamish, WA (US); Scott Malcolm Waters, Hollis, NH (US)

(73) Assignee: Amazon Technologies, Inc., Seattle, WA (US)

( * ) Notice: Subject to any disclaimer, the term of this patent is extended or adjusted under 35 U.S.C. 154(b) by 570 days.

(21) Appl. No.: 16/439,526

(22) Filed: Jun. 12, 2019

(51) Int. Cl.
| | |
|---|---|
| *B60L 53/00* | (2019.01) |
| *G05D 1/02* | (2020.01) |
| *G06Q 50/28* | (2012.01) |
| *G05D 1/00* | (2006.01) |
| *B60L 53/31* | (2019.01) |

(52) U.S. Cl.
CPC ............ *G05D 1/0297* (2013.01); *B60L 53/31* (2019.02); *G05D 1/0027* (2013.01); *G06Q 50/28* (2013.01); *G05D 2201/0207* (2013.01)

(58) Field of Classification Search
CPC ............... G05D 1/0297; G05D 1/0027; G05D 2201/0207; B60L 53/31; G06Q 50/28
USPC .......................................................... 701/2
See application file for complete search history.

(56) References Cited

U.S. PATENT DOCUMENTS

| | | | |
|---|---|---|---|
| 6,177,879 B1* | 1/2001 | Kokubu ................. | G07B 15/00 340/5.4 |
| 11,040,828 B1* | 6/2021 | Ward ........................ | B60P 1/04 |
| 2012/0286730 A1* | 11/2012 | Bonny .................... | B60L 53/35 320/109 |
| 2016/0009413 A1* | 1/2016 | Lee .......................... | B64F 1/007 701/16 |
| 2018/0024554 A1 | 1/2018 | Brady et al. | |
| 2019/0230850 A1* | 8/2019 | Johnson ............... | G05D 1/0088 |
| 2021/0032036 A1* | 2/2021 | Austrheim ........... | B65G 1/0464 |

OTHER PUBLICATIONS

Irish Ferries, Irish Ferries-Check i and Boarding Process, Oct. 31, 2012, YouTube, 1:07-1:20 seconds. (Year: 2012).*

* cited by examiner

*Primary Examiner* — Tyler J Lee
*Assistant Examiner* — Tiffany P Ohman
(74) *Attorney, Agent, or Firm* — Patterson + Sheridan, LLP

(57) ABSTRACT

An automated package retrieval system is provided. The automated package retrieval system includes a hub apparatus that includes multiple docking stations for multiple delivery devices, a power supply unit coupled to the hub apparatus, and a controller. The controller is configured to instruct at least one of the delivery devices to travel to a location to deliver an item ordered by a user. Once it is determined that the user has not retrieved the item from the delivery device, the delivery device is instructed to return to the hub apparatus. In response to detecting the user in proximity to the hub apparatus after the delivery device has returned to the hub apparatus, the user is provided with access to a storage compartment of the delivery device.

20 Claims, 12 Drawing Sheets

AFTER HOURS PACKAGE PICK UP FROM A ROBOT

BACKGROUND

The present invention relates to delivery devices, and more specifically, to a system for retrieving packages from delivery devices.

Many companies package and ship items (e.g., books, apparel, food, electronics, etc.) and/or groups of items in order to fulfill order requests from customers. For example, ordered items are typically packaged in shipping packages and shipped to the customer's residence or place of business. The delivery of physical items to a customer's specified location is traditionally accomplished using a delivery system including a human controlled truck, bicycle, cart, etc. In some cases, delivery devices (e.g., robots, autonomous ground vehicles (AGVs), personal delivery devices, etc.) can be utilized to aid the delivery of items to specified locations (e.g., users' residences). For example, a delivery device can retrieve an item(s) from a transportation vehicle (e.g., a delivery truck) or facility (e.g., warehouse) and travel to a user residence to deliver the item. The delivery device can return back to the transportation vehicle when the item has been delivered. Similarly, if the customer is unable to retrieve the item (e.g., the customer misses the scheduled delivery), the delivery device can return back to the transportation vehicle and re-attempt delivery of the item to the user's residence at a later time.

BRIEF DESCRIPTION OF DRAWINGS

Various embodiments in accordance with the present disclosure will be described with reference to the drawings, where like designations denote like elements.

DETAILED DESCRIPTION

Embodiments herein describe a package retrieval system that enables users (e.g., customers) to retrieve packages from a delivery device (also referred to herein as an AGV, robot, personal delivery device, etc.) docked within the system. The system includes a dispenser (also referred to herein as a hub) that provides a secure location for housing (or storing) and dispatching delivery devices. For example, the dispenser can provide docking stations for (re)charging the delivery devices, network connectivity for communicating with the delivery devices (e.g., software updates, data upload, etc.) and/or other computing systems (e.g., user devices, cloud computing service, etc.), fiducial markers (or aids) for calibrating sensor(s) (e.g., image sensor, camera sensor, etc.) on the delivery devices, and the like. A delivery device can be dispatched from the dispenser to a delivery location (e.g., user residence) in order to deliver a package. If the user misses the delivery attempt, the delivery device can return with the package to the dispenser to await the next scheduled delivery attempt.

However, rather than the user having to await the next scheduled delivery attempt from the delivery device, embodiments enable the user to directly retrieve the user's package from the delivery device in the dispenser. For example, the package retrieval system can detect when the user is in proximity to the dispenser to retrieve a package and, in response, automatically open (or give the user access to) the storage compartment of the particular delivery device where the user's package is stored. Once the package has been retrieved, the package retrieval system can close the storage compartment of the delivery device and resume docking activities (e.g., charging, data exchange, etc.). In this manner, embodiments provide users with flexible and secure access to packages stored in delivery devices, e.g., in cases of missed delivery attempts.

Figure 1:
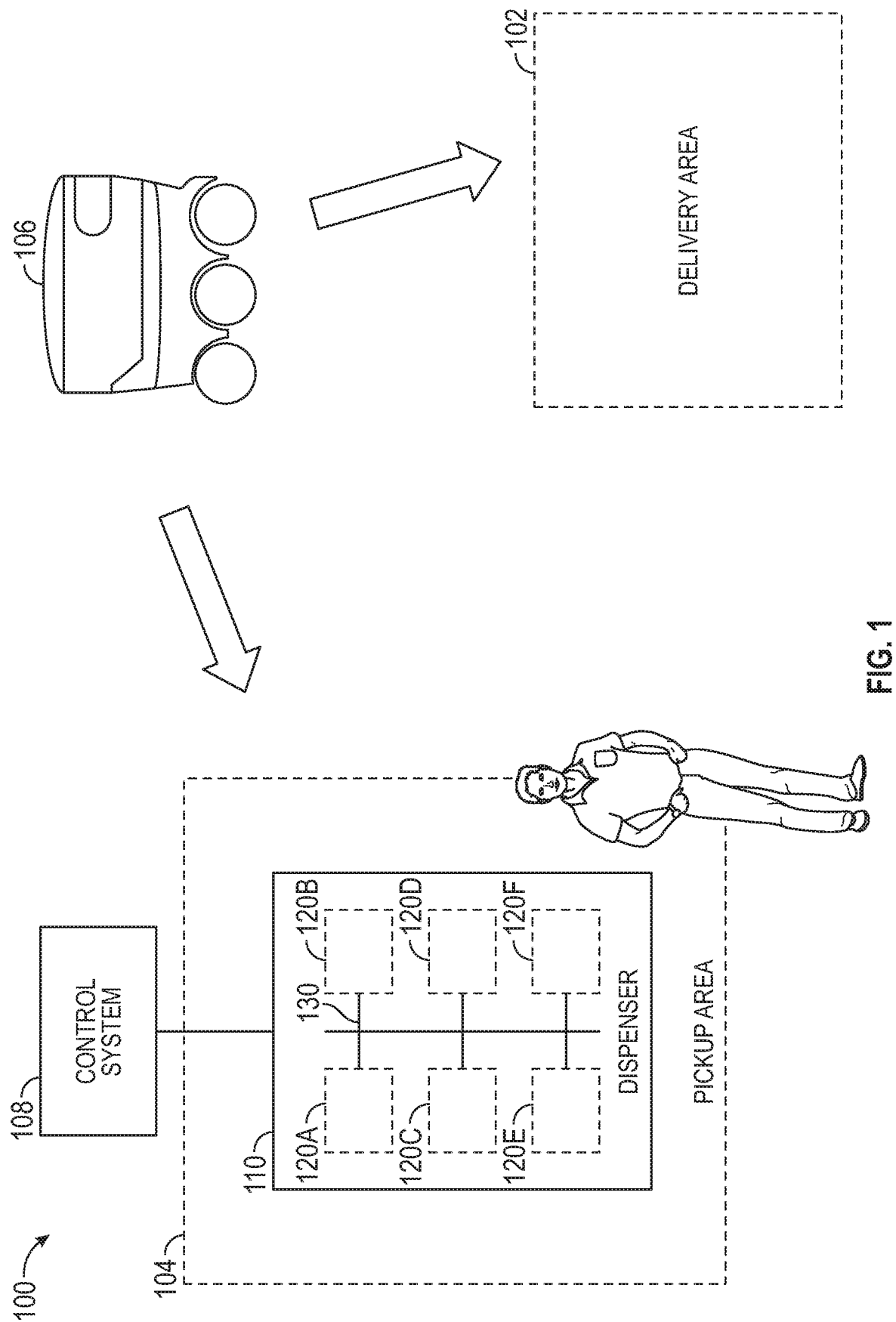
FIG. 1 is a block diagram illustrating an example package retrieval system, according to one embodiment.

FIG. 1 is a block diagram of an example (automated) package retrieval system 100, according to one embodiment. As shown, the package retrieval system 100 includes a control system 108, a pickup area 104, a delivery area 102, and a delivery device 106. Note that, for the sake of clarity, a single delivery device 106 is depicted in FIG. 1 and that, in other embodiments, the automated package retrieval system 100 can include multiple delivery devices 106.

The pickup area 104 generally represents a location that is accessible to users and within a predefined distance to the delivery area 102. In general, the pickup area 104 can be any space or configuration suitable for housing multiple delivery devices 106. That is, the pickup area 104 can have a variety of shapes, sizes, surface materials, and/or other properties. In one example, the pickup area 104 can be a parking space (or location) within a parking facility (e.g., parking lot, parking garage, etc.) or at an on-street location (e.g., parallel parking location). The pickup area 104 can be located at a business (e.g., grocery store, restaurant, banking facility, convenience store, car wash, retail center, etc.), residence, materials handling facility (e.g., warehouse, storehouse, etc.), above ground (e.g., in an office tower or residential tower), below ground (e.g., basement), etc. The pickup area 104 may receive items and/or groups of items, e.g., via manual placement, motorized movement (e.g., using forklifts), robotic movement, and so forth.

The pickup area 104 includes a dispenser (or hub apparatus) 110, which is used for housing and dispatching delivery devices 106. As discussed in more detail below, the dispenser 110 can have a variety of different configurations (e.g., shape, material, angle, height (or elevation), covering (or housing), etc.) suitable for the dimensions of the pickup area 104. In this particular embodiment, the dispenser 110 includes multiple (docking) stations 120 A-F for delivery devices 106. One or more of the stations 120 A-F may be at different heights (or elevations) and/or have different surface shapes (e.g., substantially planar, crowned, domed, concave, convex, irregular, or any other shape or combination of shapes) relative to another one or more of the stations 120 A-F. In one reference example, stations 120A and 120B may be substantially planar compared to stations 120 C-F and stations 120C and 120D may be at a smaller inclination compared to stations 120E and 120F.

As discussed below, each station 120 A-F may provide charging components and/or network connectivity for the delivery device 106 docked in the station. The delivery devices 106 may access each station via support structure 130, which can have a variety of different configurations (e.g., shape, material, angle, height (or elevation), floor surface, etc.) suitable for the pickup area 104. In one embodiment, the support structure 130 provides support for the stations 120 A-F. For example, the support structure 130 can include ramps, guide rails (for guiding delivery devices onto the ramps), locking mechanisms (for securing the delivery devices in place at their respective stations), etc. In some examples, the support structure 130 can have multiple segments that vary in height (or elevation), inclination, surface shape, etc., relative to other segments of the support structure 130. For example, the support structure 130 can include a first segment (e.g., a ramp or inclined portion) that leads to a second segment (e.g., substantially planar portion), where the stations 120 A-D are formed on the second segment and the stations 120 E-F are formed on the first segment. In other examples, some of the stations 120 can be directly (or at least partially) above other stations 120. Note that although the dispenser 110 is depicted with six stations 120 A-F, the dispenser 110 can include any number of stations 120 A-F for housing delivery devices.

In some embodiments, the dispenser 110 can be equipped with one or more fiducial markers (also referred to as aids, reference points, etc.), which the delivery devices 106 can use to automatically calibrate sensors (e.g., camera sensors) on the delivery devices 106. In one particular example, the dispenser 110 may be an enclosed structure and the fiducial markers can be located on the inside of the structure (e.g., door, side surface, top surface, etc.). The delivery devices 106 can use the fiducial markers on the inside of the structure to calibrate their respective sensors prior to exiting the dispenser 110.

As shown in FIG. 1, the control system 108 is connected to the dispenser 110. The control system 108 can include hardware components (e.g., power equipment/supply, cabling, etc.) and/or software components (e.g., a controller). In some embodiments, the control system 108 can include a housing for one or more of the components of the control system 108. The control system 108 provides control signals (or commands) to the dispenser 110 to control operation of the dispenser 110. For example, the control system 108 can open and close access barriers (e.g., front doors, side doors, top doors, etc.) of the dispenser 110 to allow delivery devices 106 to enter and exit the dispenser. In another example, the control system 108 can engage and disengage locking mechanisms and/or charging mechanisms located at the various stations 120 A-F in the dispenser. In yet another example, the control system 108 can exchange information with the various delivery devices 106 and other computing systems (e.g., management system) for controlling operation of the dispenser 110.

Additionally, the control system 108 provides control signals (or commands) to the delivery devices 106 to control operation of the delivery device 106. For example, the control system 108 can instruct one or more of the delivery devices 106 to enter and/or exit the dispenser 110, instruct one or more of the delivery devices 106 to transition to a particular station 120 or other location within the dispenser 110, instruct one or more of the delivery devices 106 to open and close a door (or lid) of the delivery device 106 providing access to an internal storage compartment of the delivery device 106, and so on.

In the embodiment depicted in FIG. 1, a delivery device 106 may receive an item (e.g., from the pickup area 104 or from another location) and be dispatched to a delivery area 102 (e.g., a residence, a business, etc.) in order to deliver the item. If the delivery device 106 misses the delivery, the delivery device 106 can return to the dispenser 110 to await retrieval by the user or the next scheduled delivery attempt. For example, the delivery device 106 can travel and dock (based on instruction from the control system 108) at one of the stations 120 A-F. In some situations, a user may later attempt (e.g., at nighttime after business hours of operation) to retrieve the item from the delivery device 106 in the dispenser 110 after the missed delivery (e.g., the user may not want to wait until the next scheduled delivery attempt).

The control system 108 may detect that the user is in proximity to or approaching the dispenser 110. In one embodiment, for example, the control system 108 can determine (or detect) the location of the user via the user device and automatically open the door of the dispenser and/or the door of the particular delivery device storing the user's item as the user approaches. In another embodiment, the control system 108 may detect the user via the user's interaction with the dispenser 110. For example, the dispenser 110 may provide a keypad (or other type of interface) that permits the user to input credentials to gain access to the delivery device 106 storing the user's item. In another example, the user may indicate, via the user device, when the user is at (or in proximity to) the dispenser 110. For example, the user may provide an unlock code via the user device to gain access to the dispenser 110. In yet another example, the user may communicate with the dispenser 110 (e.g., via the user device and control system 108) to open the dispenser 110 and/or the particular delivery device 106 from a distance (e.g., the user can trigger the dispenser to provide access to another user). In general, the user can communicate with the control system 108 and/or the delivery devices 106 in the dispenser 110 using a variety of techniques in order to determine which of the delivery devices 106 in the dispenser 110 includes the item and gain access to the delivery device 106.

In some embodiments, after authenticating and authorizing the user, via the user device, the control system 108 can automatically open (or retract) a door (or lid) of the particular delivery device 106 storing the user's item. In some embodiments discussed below, the control system 108 can additionally open (or retract) a door (or lid) of the dispenser 110 (e.g., at the station 120) where the particular delivery device 106 is located. In yet another embodiment discussed below, the control system 108 may instruct one or more of the delivery devices 106 to change stations 120 in order to position the particular delivery device 106 (that has the user's item) at a door of the dispenser 110. In this embodiment, the dispenser 110 can have a configuration that allows the delivery devices 106 to transition to different stations 120 without exiting the dispenser 110 or a configuration in which at least some of the delivery devices 106 have to exit the dispenser 110. Once the item is retrieved, the control system 108 can instruct the delivery device 106 to close the door to its storage compartment and/or close the door of the dispenser 110.

Figure 2:
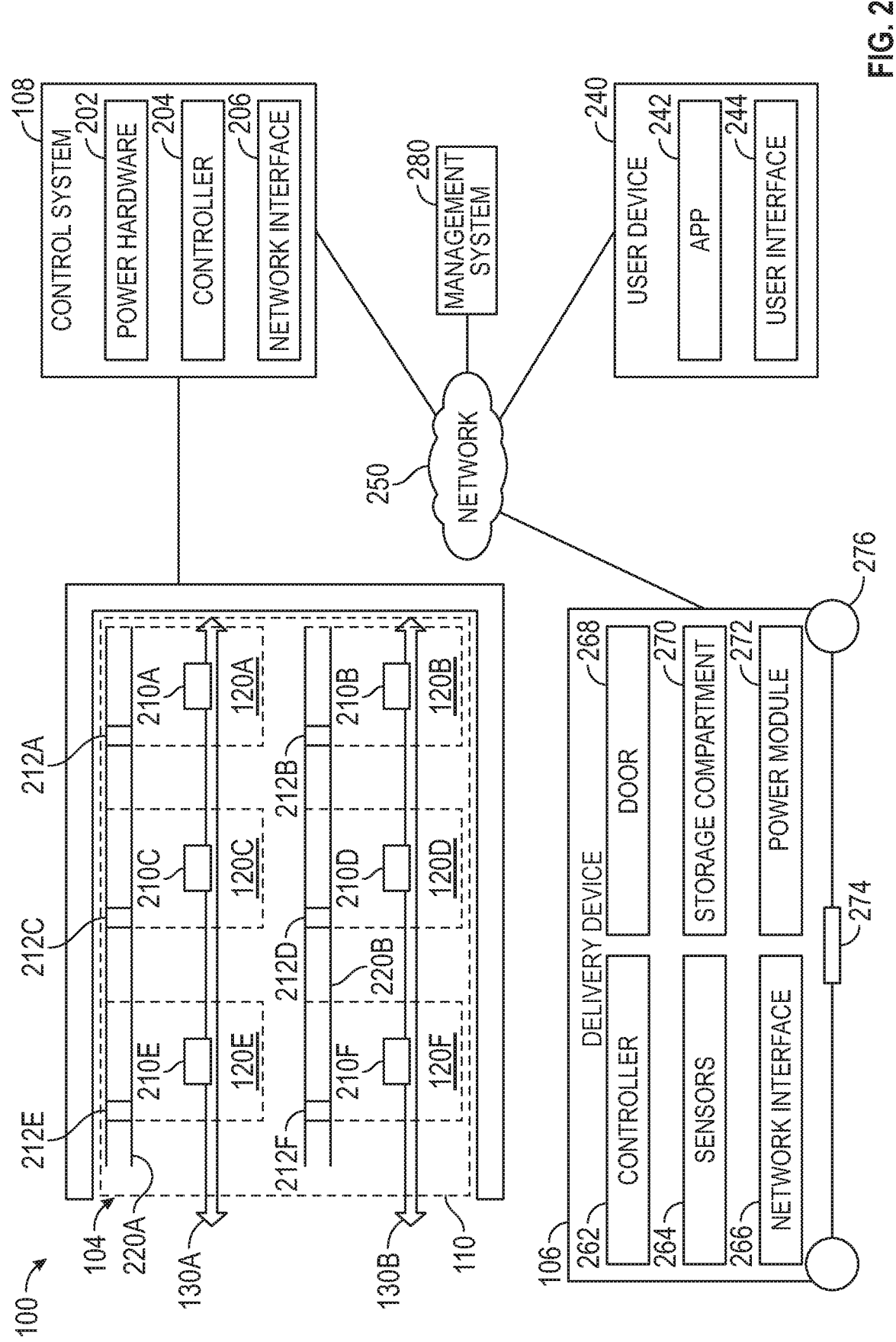
FIG. 2 is a block diagram further illustrating the package retrieval system described in FIG. 1, according to one embodiment.

FIG. 2 further illustrates components of the automated package retrieval system 100, described relative to FIG. 1, according to one embodiment. As shown, FIG. 2 includes the control system 108, the delivery device 106, a user device 240, and a management system 280 interconnected to each other via a network 250. Network 250, in general, is representative of local area network (LAN) (e.g., Ethernet), wide area network (WAN), wireless LAN (WLAN), personal area network (PAN), cellular network, etc.

The control system 108 can include hardware components, software components, or combinations thereof. Here, the control system 108 includes power hardware (or equipment) 202, a controller 204, and a network interface 206. The power hardware (or equipment) 202 can include, for example, voltage transformers, regulators, power supply units (e.g., batteries, generators), cabling, etc. for powering the dispenser 110 and (re)-charging the delivery devices 106. The power hardware 202 can provide for the stations 120 in the dispenser 110 dedicated power connections to a power source (e.g., grid, battery, generator, etc.).

The controller 204 provides control signals (or commands or instructions) to the dispenser 110 and the delivery device 106. As noted, the controller 204 can open and close doors of the dispenser 110, instruct the delivery device 106 to open and close its door 268 to its storage compartment 270, engage and disengage charging components 210 A-F and charging component 274, engage and disengage locking mechanisms 212 A-F, and the like. In one embodiment, the controller 204 can include processors or micro-controllers. The controller 204 can include solely hardware and firmware or can include combinations of hardware and software elements. The network interface 206 may communicate using a wired communication protocol (e.g., Ethernet), a wireless communication protocol (e.g., WiFi, LTE, 5G), etc.

In one embodiment, the controller 204 can download software updates for the delivery devices and update the software on each delivery device 106. Doing so can reduce demand on communication resources, as each delivery device does not have to connect to a management system (e.g., management system 280) to download large payloads. For example, the controller 204 can download a software update for a delivery device 106 while the delivery device 106 is attempting to deliver a package, so that the software update is ready when the delivery device 106 returns to the dispenser 110.

In this further illustration of the dispenser 110, the dispenser 110 is located within a parking space (or location) used for parking a motor vehicle (e.g., car, truck, van, etc.). Within the dispenser 110, the support structure for each station 120 A-F is formed by a segment (e.g., segments 130A, 130B) of the support structure 130 and a guided rail (e.g., guided rails 220A, 220B). In particular, the support structures for stations 120A, 120C, and 120E are formed by segment 130A and guided rail 220A and the support structures for stations 120B, 120D, and 120F are formed by segment 130B and guided rail 220B. The guided rails 220A and 220B provide a mechanism for guiding and securing the delivery devices 106 into the respective stations 120. In this embodiment, a single guided rail 220 is provided for engaging the wheels 276 on one side of the delivery device 106. However, in other embodiments, the dispenser 110 can include guided rails 220 for engaging the wheels 276 on both sides of the delivery device 106.

Each station 120 A-F includes charging component(s) 210 A-F, respectively. In general, the charging components 210 A-F can engage with a charging component 274 on the delivery device 106 to recharge a power module 272 (e.g., a battery) of the delivery device 106. In this particular embodiment, each of the charging components 210 A-F includes a fixed base charge pad (or plate) and the charging component 274 (located at the bottom surface) of the delivery device 106 includes charging contact(s). In this case, when the charging component 274 is aligned over one of the charging components 210 A-F, the delivery device 106 can (e.g., automatically or based on instruction from control system 108) extend charging component 274 (e.g., downward) to engage the charging component 210. The delivery device 106 can use sensors (e.g., proximity sensor) to determine when it is aligned over one of the charging components 210 A-F. In some embodiments, the engaging and disengaging of the charging components 210 and 274 can be achieved via magnets (of different polarities) placed along the segments 130A and 130B and the delivery device 106. Note that, in some embodiments, the stations 120 can (re)charge the delivery device 106 using other techniques (e.g., in addition to or alternative to the charging components 210), such as solar power, wireless inductive charging, etc.

Each station 120 A-F also includes locking components 212 A-F, respectively. The locking components 212, in general, can engage with the wheels 276 of the delivery device 106 that are within a guided rail 220. As noted, the locking components 212 A-F can be controlled directly or remotely by the control system 108. The locking components 212 A-F can employ various forms of locking mechanisms, including, but not limited to, mechanical, magnetic, electrical, or other forms of locking mechanisms.

The delivery device 106 includes a controller 262, sensors 264, network interface 266, door 268, storage compartment 270, a power module 272, and a charging component 274. The controller 262 controls the operation of the delivery device 106, e.g., based on signals received via the network interface 266 from the control system 108 and/or management system 280. The sensors 264 enable the delivery device 106 to detect obstacles that may be in a travel path of the delivery device 106, navigate within the dispenser 110, determine position and/or placement within the dispenser 110, etc. The sensors 264 can include, but are not limited to, image (camera) sensors, thermal sensors, infrared sensors, position/location (e.g., GPS) sensors, weather sensors, time of travel sensors, accelerometers, sound sensors, proximity sensors, etc. Using the sensors 264, the delivery device 106 can detect obstacles (e.g., debris, doors, persons, traffic, etc.) in its travel path, navigate around the obstacles, detect presence (or absence) of items in its storage compartment 270, and the like. As noted, one or more of the sensors 264 can be automatically calibrated using one or more fiducial markers provided within the dispenser 110.

In addition, the control system 108 and/or the management system 280 can use information from the sensors 264 (received via the network interface 266) to instruct or control operation of the delivery device 106. For example, the control system 108 can instruct the delivery device 106 to open or close the door 268 to the storage compartment 270 based on whether feedback from the sensors 264 indicates the presence or absence of item(s) in the storage compartment. In another example, the control system 108 can instruct the delivery device 106 to travel to different stations 120 within the dispenser 110, engage/disengage charging mechanisms, etc., based on feedback from the sensors 264.

The power module 272 provides power to the components (e.g., controller 262, motor(s), etc.) of the delivery device 106. The power module 272 may be in the form of battery power, solar power, gas power, super capacitor, fuel cell, or a combination thereof. The power module 272 can be recharged at the stations 120 using various techniques. The network interface 266 may communicate using a wireless communication protocol (e.g., WiFi, LTE, 5G, etc.). The management system 280 provides control of the control system 108 and the delivery device(s) 106.

The user device 240 includes an application (or app) 242 and a user interface 244. In one embodiment, the application 242 is mobile shopping application that permits a user (or customer) to browse and purchase items within a retailer's inventory. Using the application 242, the user can arrange for delivery of purchased items via a delivery device 106 or other means. Additionally, in embodiments herein, the application 242 permits the user to gain access to dispenser 110 in order to retrieve items directly from a delivery device 106. In some cases, the application 242 may provide the user (e.g., on user interface 244) with a pictorial (or graphical) representation of the arrangement of the delivery devices 106 within the dispenser 110 and provide an indication (e.g., an illustration) of the particular delivery device 106 that includes the user's items. In one embodiment, the application 242 may update the graphical representation in real-time, based on the user's location (e.g., as the user moves closer or further away from the particular delivery device 106).

Using the application 242, the user can enter credentials (e.g., username/password, unlock code, etc.) in order to unlock the dispenser 110 and unlock the door 268 to the storage compartment 270 of the delivery device 106. Although not shown, in some cases, the dispenser 110 and/or control system 108 may provide a user interface that permits a user to interact with the dispenser 110, e.g., in order to retrieve an item. That is, the user can provide credentials directly on the dispenser 110 (or on the control system 108 coupled to the dispenser 110) in order to gain access to the particular delivery device 106 in the dispenser 110.

Figure 3:
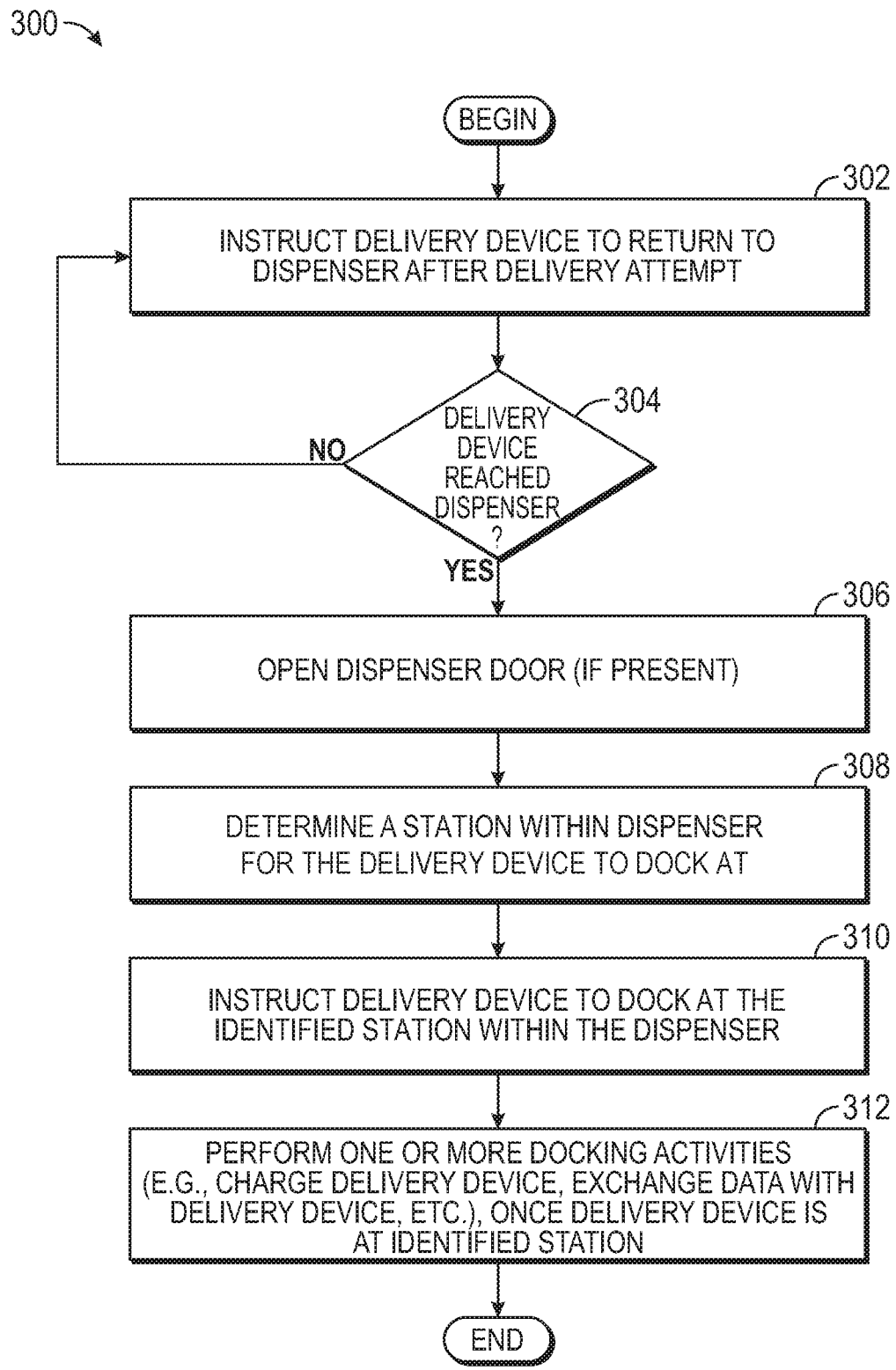
FIG. 3 is a flowchart of a method for controlling a delivery device to enter a dispenser, according to one embodiment.

FIG. 3 is a flowchart of a method 300 for controlling a delivery device to enter a dispenser, according to one embodiment. The method 300 may be performed by a control system (e.g., control system 108) and/or one or more other components of the automated package retrieval system 100.

As shown, the method 300 begins at block 302, where the control system instructs a delivery device (e.g., delivery device 106) to return to a dispenser (e.g., dispenser 110) within a pickup area (e.g., pickup area 104) after a delivery attempt. For example, the delivery device may have been dispatched to a delivery area (e.g., delivery area 102) to fulfill delivery of a customer's order and may have missed the delivery attempt (e.g., the customer may have been unable to retrieve the items from the delivery device). At block 304, the control system determines whether the delivery device has reached the dispenser (e.g., whether the delivery device is within proximity of the dispenser). If not, the control system can use the delivery device controller (e.g., controller 262) and/or another computing system (e.g., the management system 280) to generate a travel path for the delivery device to follow to reach the coordinates of the dispenser. The control system can consider such things as buildings, terrain, densely populated areas, and the like to generate a travel path between the delivery area and the dispenser. The control system controller may provide continuous information to the delivery device controller in order to guide the delivery device to the dispenser or upload the travel path to the delivery device controller and permit the delivery device controller to guide the delivery device to the dispenser.

Once the control system determines the delivery device has reached the dispenser, the control system opens a door (or other access barrier) of the dispenser (e.g., assuming a door is present) to allow the delivery device to enter the dispenser (block 306). In some examples discussed below, the control system can retract a front access barrier to give the delivery device access to a ramp (e.g., segment 130A) and guided rail (e.g., guided rail 220A) structure of the dispenser.

At block 308, the control system determines a station within the dispenser where the delivery device can dock (e.g., for charging, data exchange, etc.). In some embodiments, the control system can select an unoccupied station within the dispenser. For example, the station can be the initial station within the dispenser (e.g., at the front/end of the dispenser). In some embodiments, the control system can select an occupied station within the dispenser. For example, assuming there is a queue of delivery devices present in the dispenser, the initial station within the dispenser (e.g., at the front/end of the dispenser) may be occupied. In this case, the control system may instruct each of the delivery devices in the dispenser to transition to a different station to allow the returning delivery device to dock at the initial station. In general, the determination of the station within the dispenser can be based on the location of other delivery devices within the dispenser, the configuration of the dispenser (e.g., number of stations, entry/exit door locations, etc.), and the like.

At block 310, the control system instructs the delivery device to dock at the identified station within the dispenser. In some embodiments, depending on the configuration of the dispenser and/or location of other delivery devices in the dispenser, the control system (at block 310) may also instruct one or more other delivery devices to transition to different locations (e.g., inside or outside of the dispenser) in order to permit the delivery device to dock at the identified station. At block 312, the control system performs one or more docking activities via the dispenser once the delivery device is at the identified location. For example, as noted, the control system can charge the delivery device, exchange data with the delivery device, etc.

Figure 4:
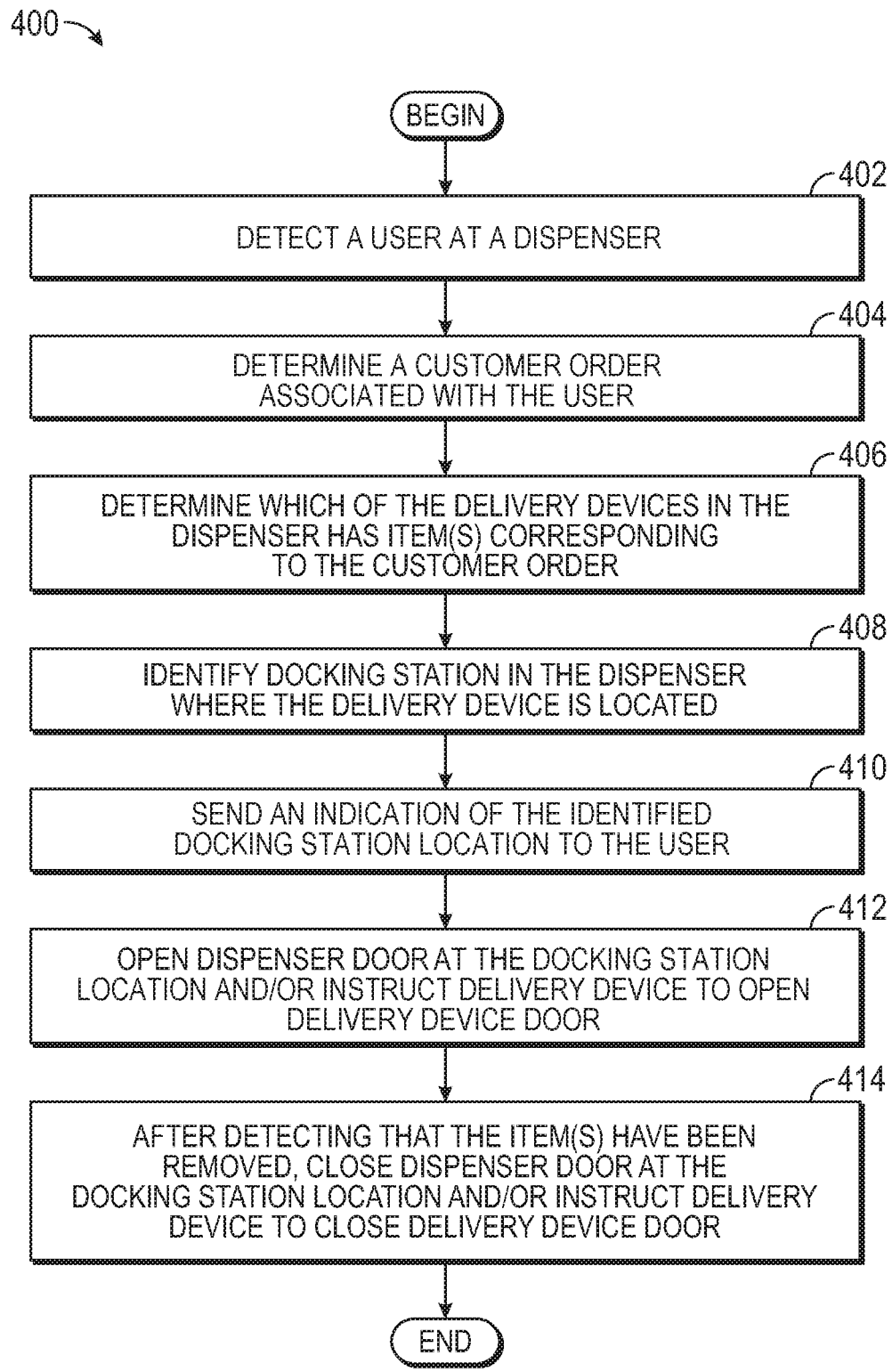
FIG. 4 is a flowchart of a method for controlling access to a dispenser, according to one embodiment.

FIG. 4 is a flowchart of a method 400 for controlling access to a dispenser (e.g., dispenser 110), according to one embodiment. The method 400 may be performed by a control system (e.g., control system 108) and/or one or more other components of the automated package retrieval system 100.

As shown, the method 400 begins at block 402, where the control system detects a user at a dispenser (e.g., dispenser 110) in a pickup area (e.g., pickup area 104). In one embodiment, the control system can detect that the user is in proximity to the dispenser via a user device. For example, the control system can determine that the location of the user device is within a threshold range of the dispenser. In another embodiment, the control system can detect the user based on an indication received from the user. In one reference example, the user can send an indication, via the user device, to the control system when the user is in proximity to the dispenser (or, in some cases, at a remote distance away from the dispenser). In another reference example, the user can indicate their presence via a keypad (or another type of interface) provided on the dispenser. In another embodiment, the control system can detect that the user is at a dispenser based on an indication received from one or more of the delivery devices within the dispenser. For example, a delivery device may detect the presence of a user (via one of its sensors) and notify the control system.

At block 404, the control system determines a customer order associated with the user. In one example, the control system can interact with another computing system (e.g., management system 280, database, etc.) to determine the associated customer order. For example, the control system may send a request for a customer order number corresponding to the user (e.g., user credentials) to the other computing system. At block 406, the control system determines which of the delivery devices in the dispenser has item(s) corresponding to the customer order.

At block 408, the control system identifies a station (e.g., station 120) in the dispenser where the delivery device is located. At block 410, the control system sends an indication of the station location to the user (e.g., via the user device, via an interface on the dispenser, etc.). In one embodiment, the control system can generate a graphical representation of the arrangement of the delivery devices in the dispenser and send information associated with the graphical representation to the user device for display on a user interface (e.g., user interface 244). For example, the information associated with the graphical representation can include the positions (or locations) of the delivery devices within the arrangement. The control system can update the graphical representation, e.g., in real-time, to show the user's location in relation to the delivery device that includes the user's item(s).

At block 412, the control system opens a dispenser door (or other access barrier) at the station location (e.g., assuming the dispenser is equipped with an access barrier). As discussed below, in one embodiment, the dispenser can include multiple access barriers (e.g., doors) to permit access to different delivery devices in the dispenser. In one example, the dispenser can include a separate access barrier above each station in the dispenser. In another example, the dispenser can include a separate access barrier above a set of stations. In addition to (or in alterative to) opening a dispenser door, the control system (at block 412) can instruct the delivery device to open the delivery device door (e.g., door 268) in order to let the user gain access to the delivery device's storage compartment (e.g., storage compartment 270). At block 414, the control system closes the dispenser door at the station location and/or instructs the delivery device to close the delivery device door.

Figure 5A:
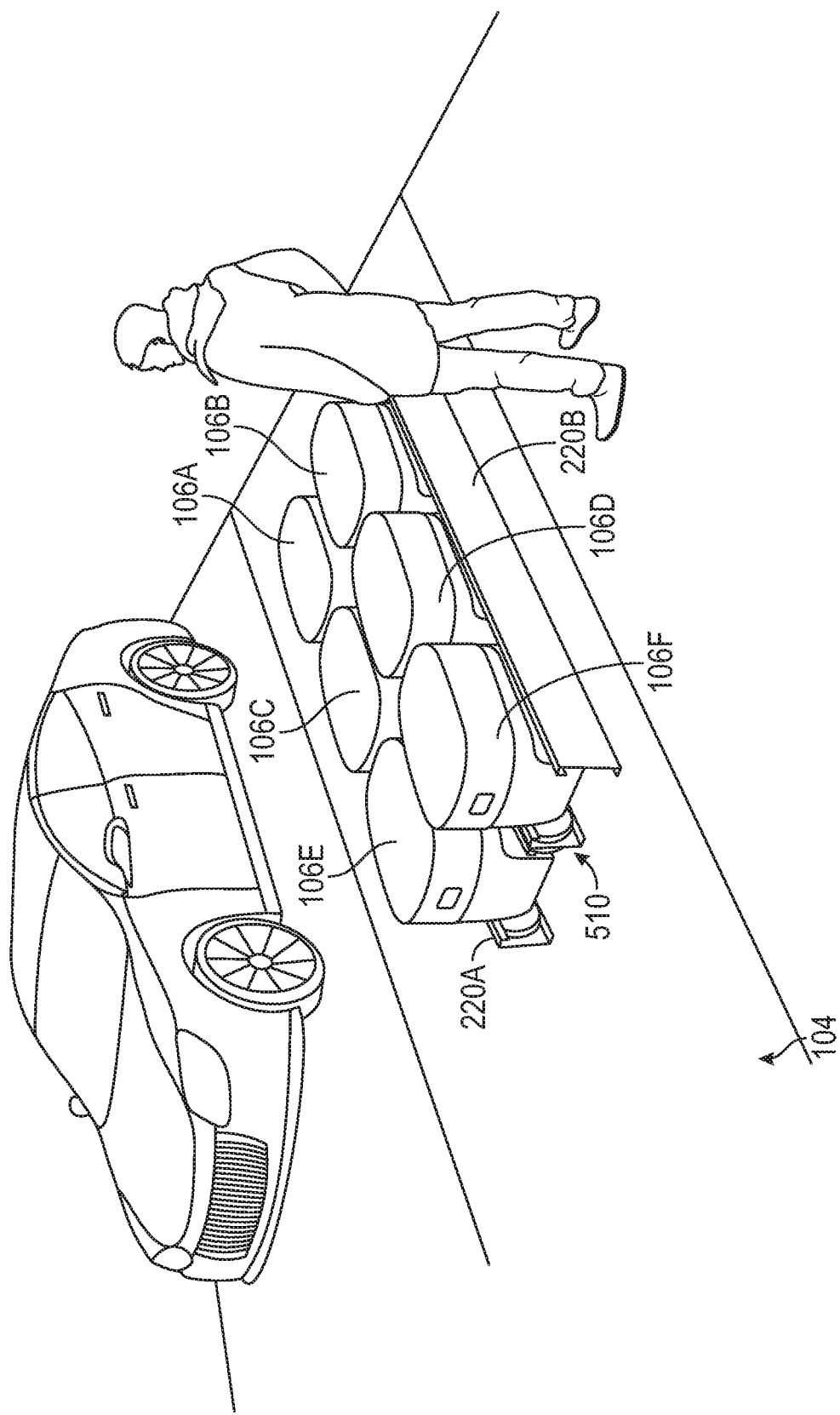
FIGS. 5A-5B illustrate an example package retrieval scenario from a dispenser located in a pickup area, according to one embodiment.
Figure 5B:
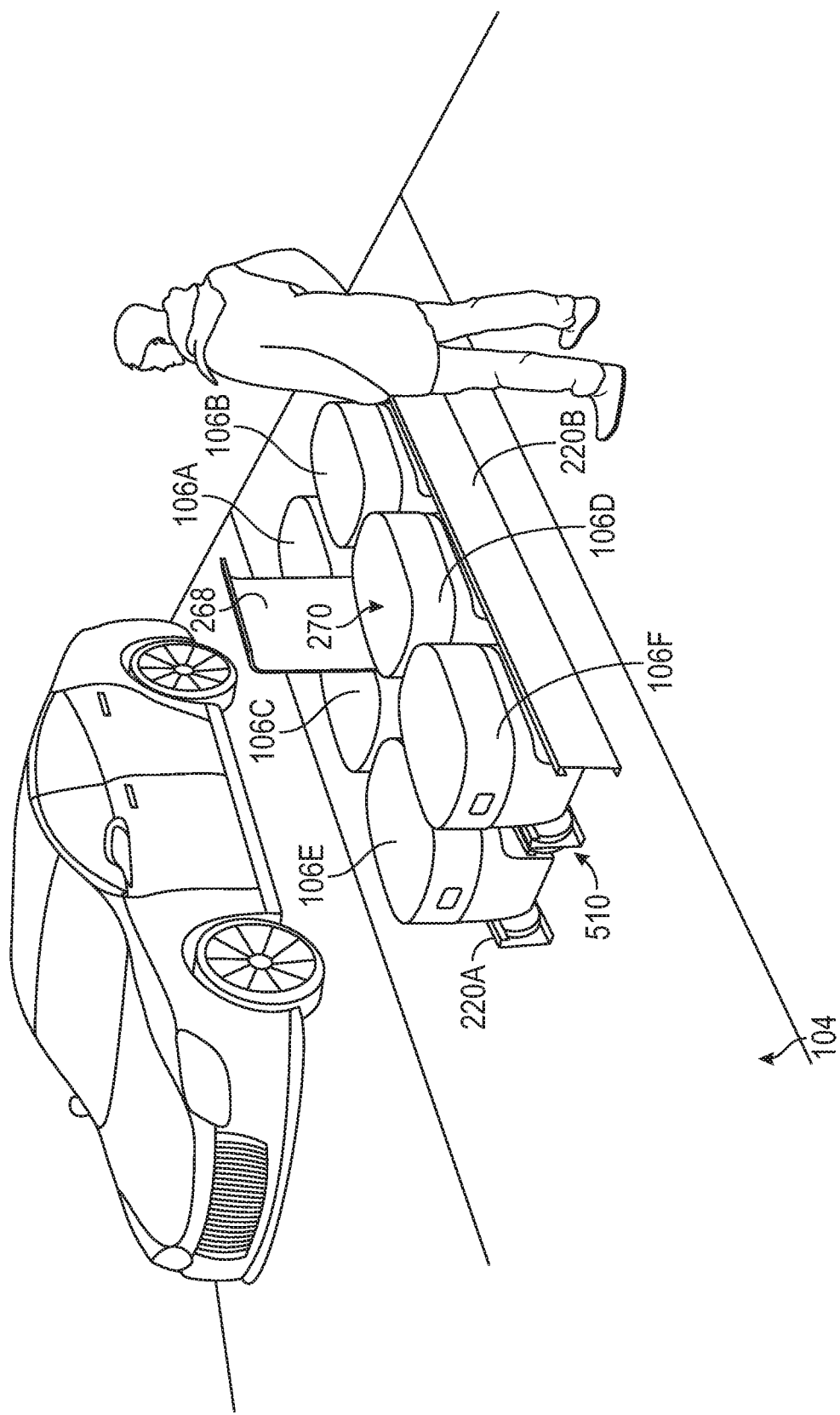

FIGS. 5A-5B illustrate an example package retrieval scenario from a dispenser 510 located in a pickup area (e.g., pickup area 104), according to one embodiment. As shown in this embodiment, the pickup area 104 is a parking space (or location) used for parking a motor vehicle (e.g., car, truck, van, etc.) and includes a dispenser 510, which is configured with six stations 106 A-F on a substantially planar flat surface. The dispenser 510 includes guide rails 220A to secure the wheels located on both sides of delivery devices 106A, 106C, and 106E and guide rails 220B to secure the wheels located on both sides of delivery devices 106B, 106D, and 106F. In another embodiment, the dispenser 510 can include single guide rails to secure the wheels located on one side of the delivery devices (e.g., a guide rail to secure the wheels located on one side of delivery devices 106 A, 106C, and 106 E and another guide rail to secure the wheels located on one side of delivery devices 106B, 106D, and 106F). As noted, the guide rails 220A and 220B can be used to secure the delivery devices 106 A-F to the stations 120 A-F in the dispenser 510. Although not shown in FIG. 5, a control system box or housing (e.g., for control system 108) can be located in proximity to the pickup area 104.

As shown in FIG. 5A, a user (or customer) may visit the dispenser 510 to retrieve a package from one of the delivery devices 106 A-F (e.g., the customer may have missed an earlier delivery attempt from one of the delivery devices 106). Using a user device (e.g., mobile device), the user can input an access code (or other types of credentials) to determine which of the delivery devices 106 A-F includes the user's package and gain access to that delivery device's storage compartment. As shown in FIG. 5B, for example, the user can determine, based on an indication received on the user device, that delivery device 106D is the delivery device that includes the user's package. After verifying the user (e.g., authenticating and authorizing the user), the control system (not shown in FIG. 5) can instruct delivery device 106D to open door 268 to the storage compartment 270. After determining that the package has been retrieved from the storage compartment 270 (e.g., using one or more sensors 264), the control system can instruct delivery device 106D to close door 268 to the storage compartment 270.

Figure 6:
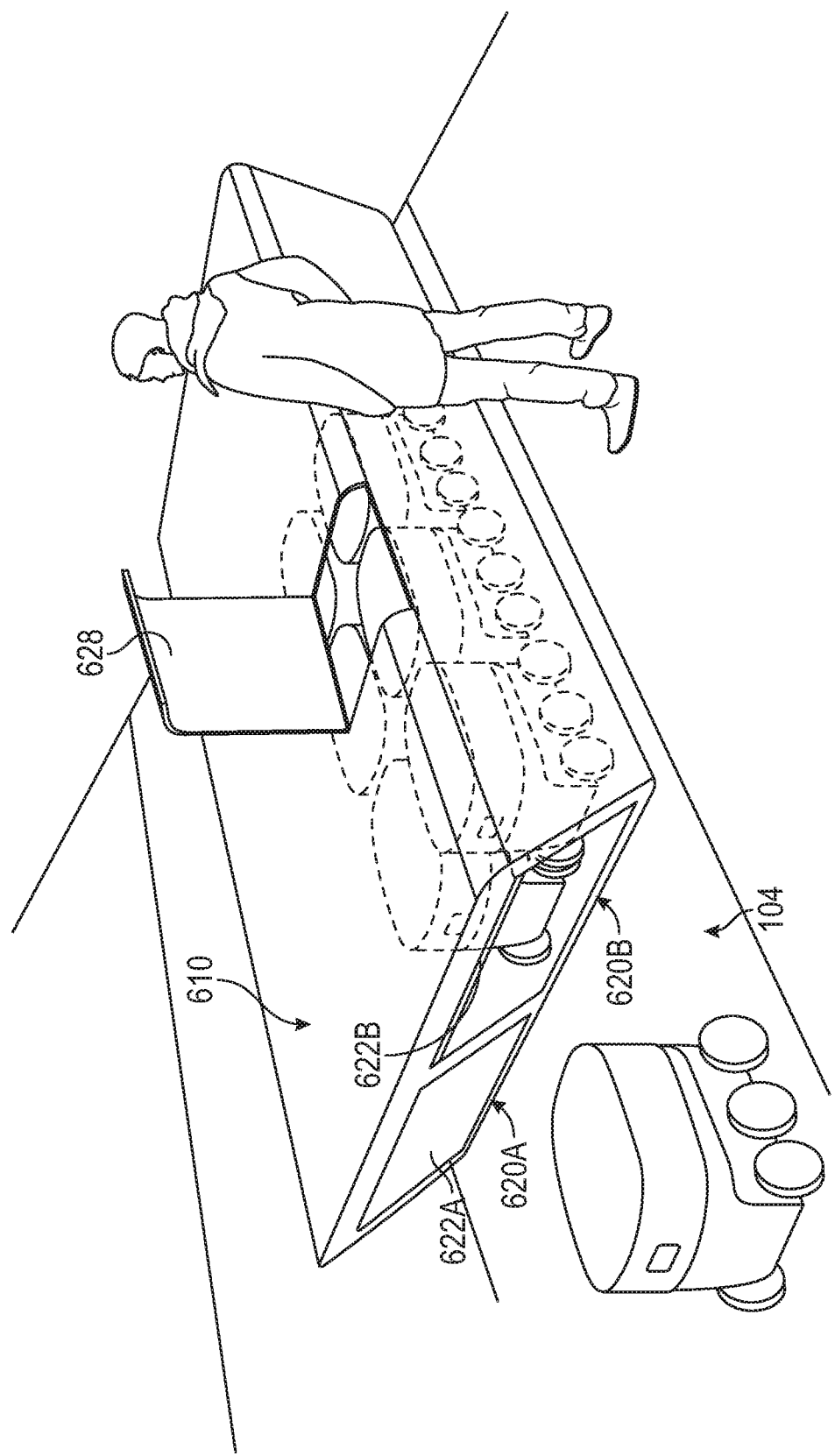
FIG. 6 illustrates another example package retrieval scenario from a dispenser located in a pickup area, according to one embodiment.

FIG. 6 illustrates another example package retrieval scenario from a dispenser 610 located in a pickup area (e.g., pickup area 104), according to one embodiment. As shown in this embodiment, the pickup area 104 is a parking space (or location) used for parking a motor vehicle (e.g., car, truck, van, etc.) and includes a dispenser 610. Compared to the dispenser 510, the dispenser 610 is a container (or housing) structure with multiple stations for docking delivery devices. As shown in this particular embodiment, the dispenser 610 includes two docking bays 620A and 620B. Each docking bay 620A and 620B can support multiple stations for docking delivery devices. For example, although not shown in FIG. 6, within the docking bays 620A and 620B, the dispenser 610 can include guide rails, locking components, charging components, etc., for securing each delivery device to a given station. Here, the dispenser 610 can support (or house) twenty delivery devices (e.g., two rows×five columns of delivery devices in each docking bay for a total of ten delivery devices in each docking bay).

Figure 7A:
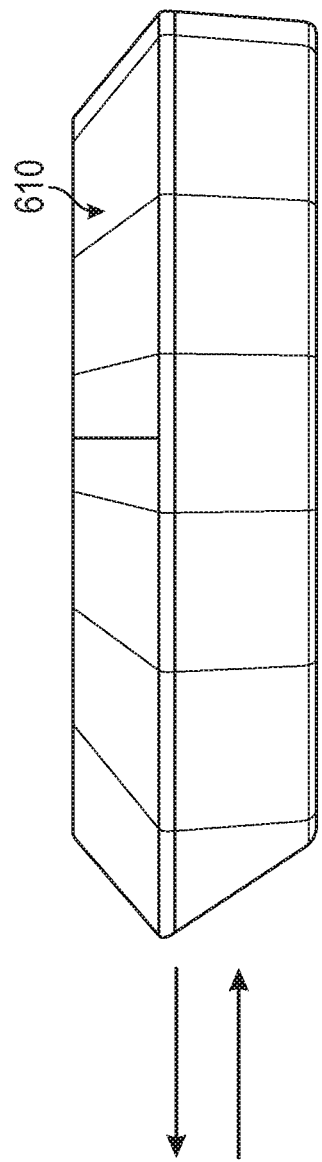
FIG. 7A illustrates an example of accessing a dispenser located in a pickup area, according to one embodiment.
Figure 7B:
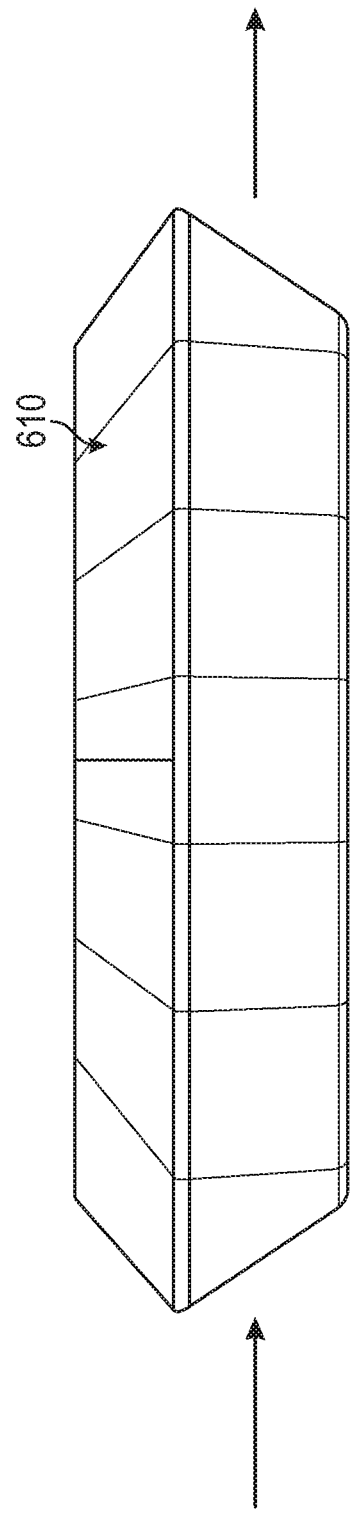
FIG. 7B illustrates another example of accessing a dispenser located in a pickup area, according to one embodiment.

Delivery devices can enter and exit the docking bays 620A and 620B via respective access barriers (e.g., retractable doors) 622A and 622B. In one embodiment, delivery devices may enter and exit the dispenser 610 using the same access barrier 622A or 622B, e.g., as shown in FIG. 7A. In another embodiment shown in FIG. 7B, the dispenser 610 can be configured with access barriers on opposite sides of the dispenser 610. In such a configuration, delivery devices can enter the dispenser 610 from a first side and exit the dispenser 610 from a second (e.g., opposite) side.

Referring back to FIG. 6, the dispenser 610 also includes one or more access barriers 628 located above the stations in the dispenser 610. For example, the access barriers 628 permit a user to gain access to a particular delivery device (or set of delivery devices) in order to retrieve a package. The access barriers 628 also allow the particular delivery devices to open their doors (e.g., door 268) (or access barriers). For example, the access barriers 628 may be at a height above the delivery devices that is sufficient to allow the delivery device to open (e.g., retract, pop open, etc.) its door. Here, the dispenser 610 includes an access barrier 628 located above each column of delivery device stations in a docking bay 620.

For the dispenser 610, after verifying the user (e.g., authenticating and authorizing the user), the control system (not shown in FIG. 6) can open the door 628 above the delivery device that includes the user's package. After opening the door 628, the control system can instruct the delivery device to open its door 268 to let the user retrieve the package from the delivery device's storage compartment 270. After determining that the package has been retrieved from the storage compartment 270 (e.g., using one or more sensors 264), the control system can instruct the delivery device to close its door 268 and close the door 628 to the dispenser 610.

Figure 8A:
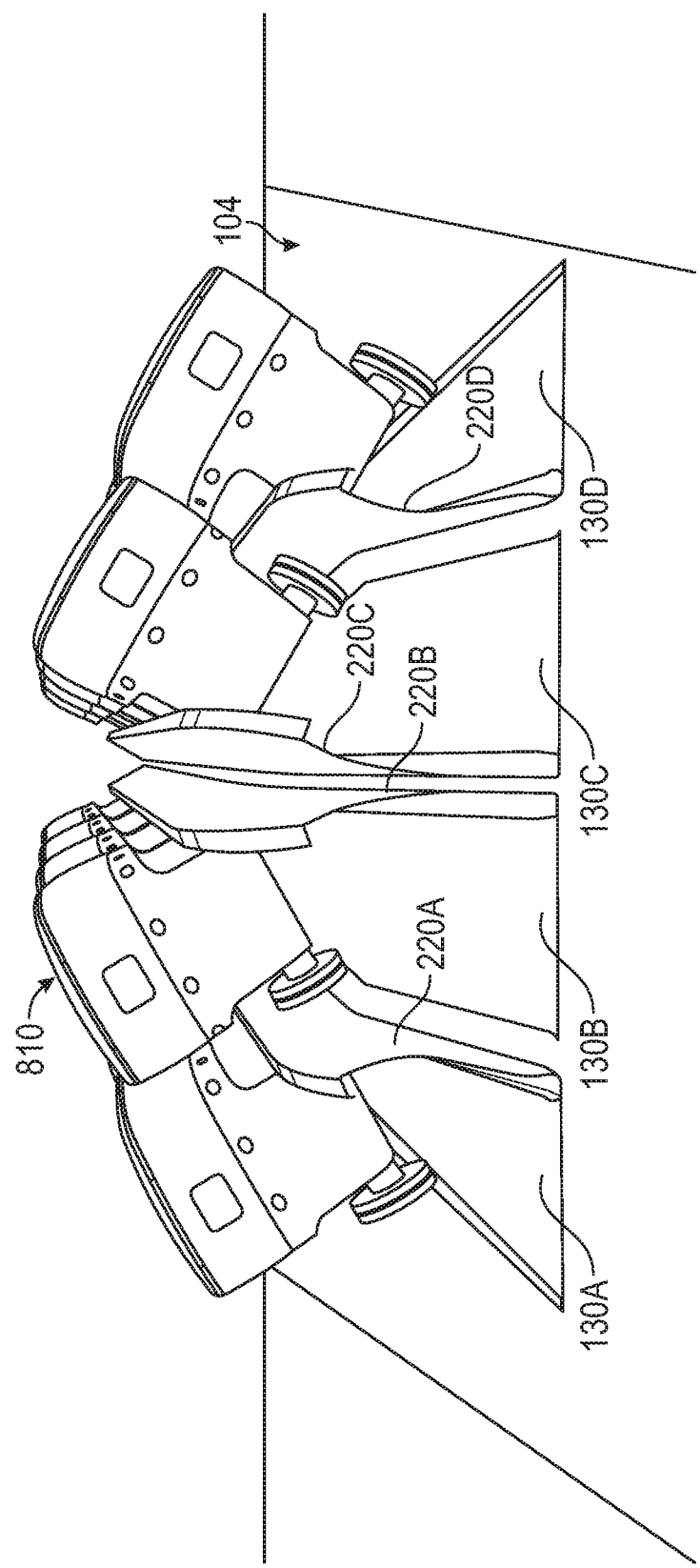
FIGS. 8A-8B illustrate different views of an example dispenser located in a pickup area, according to one embodiment.
Figure 8B:
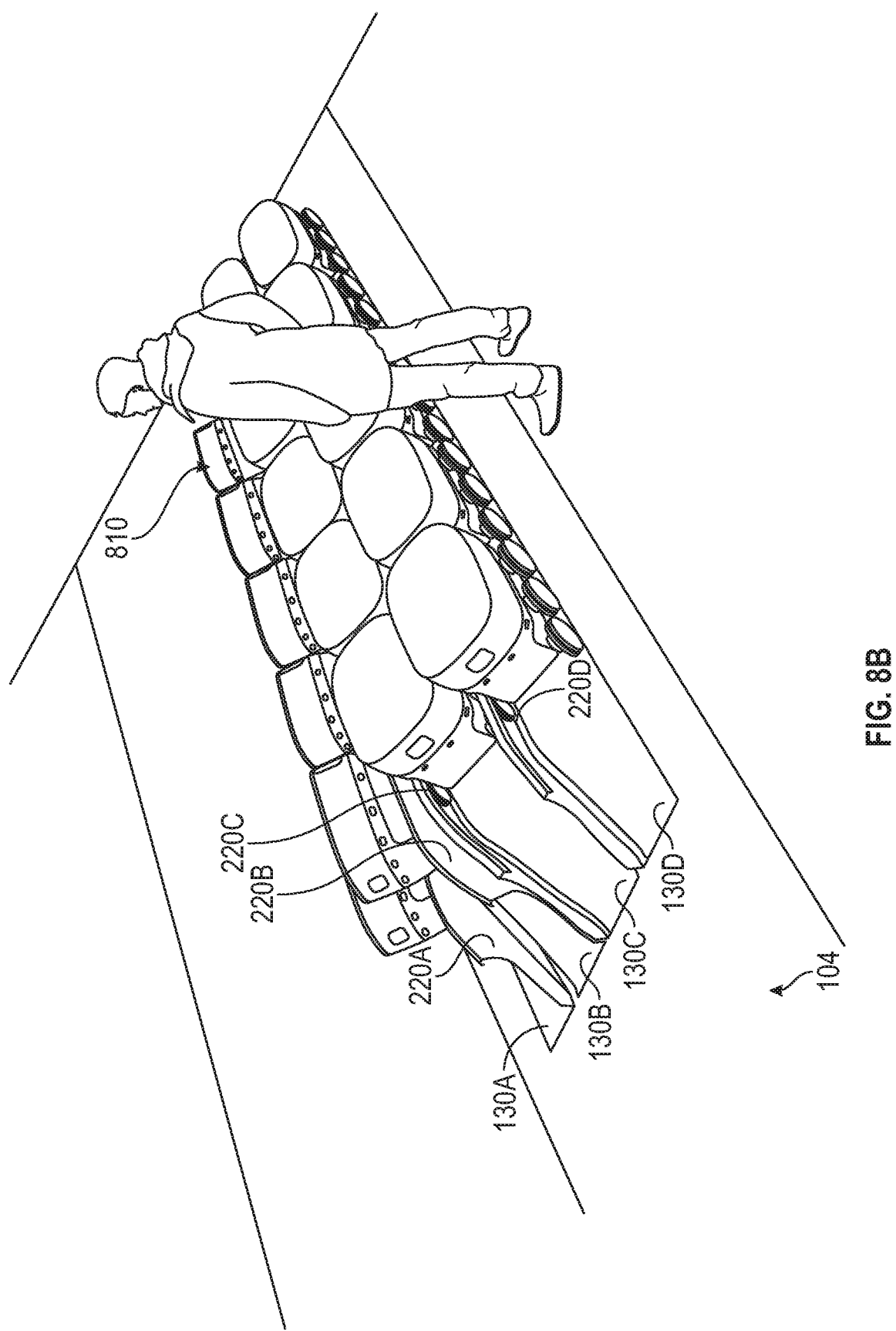

FIGS. 8A-8B illustrate different views of an example dispenser 810 located in a pickup area 104, according to one embodiment. In particular, FIG. 8A illustrates a front view of the dispenser 810 and FIG. 8B illustrates a perspective view of the dispenser 810. In this embodiment, the pickup area 104 is a parking space (or location) used for parking a motor vehicle (e.g., car, truck, van, etc.) and includes a dispenser 610. The dispenser 810 is configured with support structure segments 130A, 130B, 130C, and 130D, which form the support structure for stations 120 within the dispenser 810. Here, each support segment 130 A-D has a different configuration (e.g., inclination, curve, etc.). At least a portion of the support segments 130 A-D, for example, includes a ramp for elevating the delivery devices. Each support segment 130 A-D includes a respective guided rail 220 A-D for securing delivery devices to the support segment 130 A-D. As shown, in some embodiments, each support structure segment 130 can be curved in order to orient the delivery devices towards an area (e.g., sides of the parking space) that is accessible to users. In other embodiments, the ramp portion of the support structure segments 130 can lead to a substantially planar surface.

Figure 9:
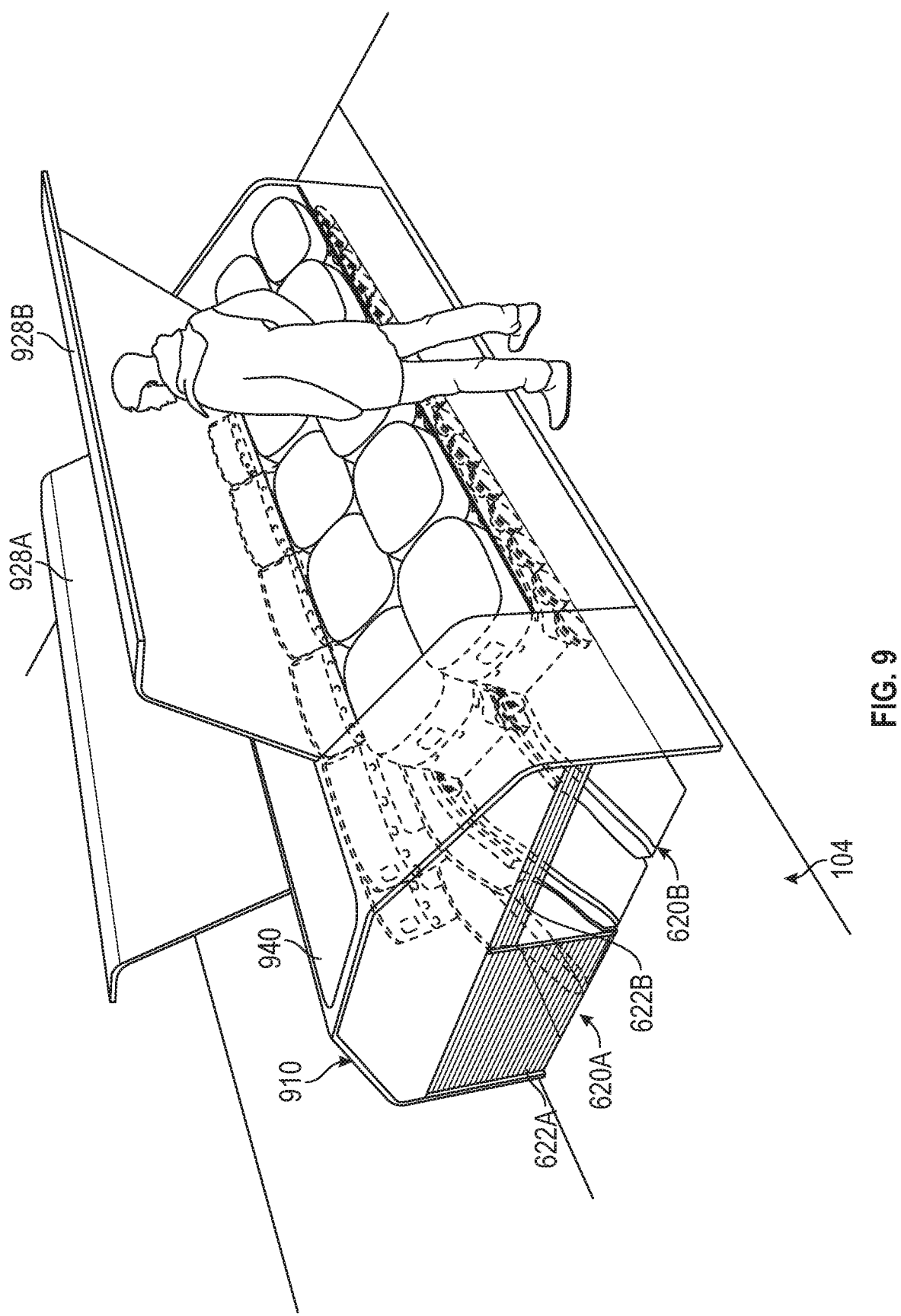
FIG. 9 illustrates another example dispenser located in a pickup area, according to one embodiment.

FIG. 9 illustrates an example dispenser 910 located in a pickup area 104, according to one embodiment. In this embodiment, the pickup area 104 is a parking space (or location) used for parking a motor vehicle (e.g., car, truck, van, etc.) and includes a dispenser 910. Compared to the dispenser 810, the dispenser 910 is a container (or housing) structure that includes the support segments 130 A-D and guided rails. The dispenser 910 further includes an access barrier 928A over docking bay 620A and an access barrier 928B over docking bay 620B. In one embodiment, the access barriers 928A and 928B may be implemented as fixed coverings (e.g., the access barriers 928A and 928B are always open) to protect the delivery devices and/or a user from weather conditions (e.g., rain, snow, etc.). In another embodiment, the access barriers 928A and 928B may be implemented as doors that open and close, based on commands from a control system (e.g., control system 108). In some cases, the dispenser 910 can include solar panel(s) 940 to provide power for the dispenser 910.

Note that the dispensers depicted in FIGS. 5A, 5B, 6, 7A, 7B, 8A, 8B, and 9 are provided as reference examples of dispenser configurations that can be used to dock one or more delivery devices. In some embodiments, a dispenser may have a different configuration from one of the depicted examples (e.g., a different number of access barriers, a different number of docking bays, a different number of docking stations, etc.). Similarly, in some embodiments, a dispenser can have a configuration that is based on a combination of features from the depicted examples. For example, instead of having access barriers 928A and 928B, the dispenser 910 can be equipped with multiple access barriers 628 over each of the docking bays 620A and 620B.

Figure 10:
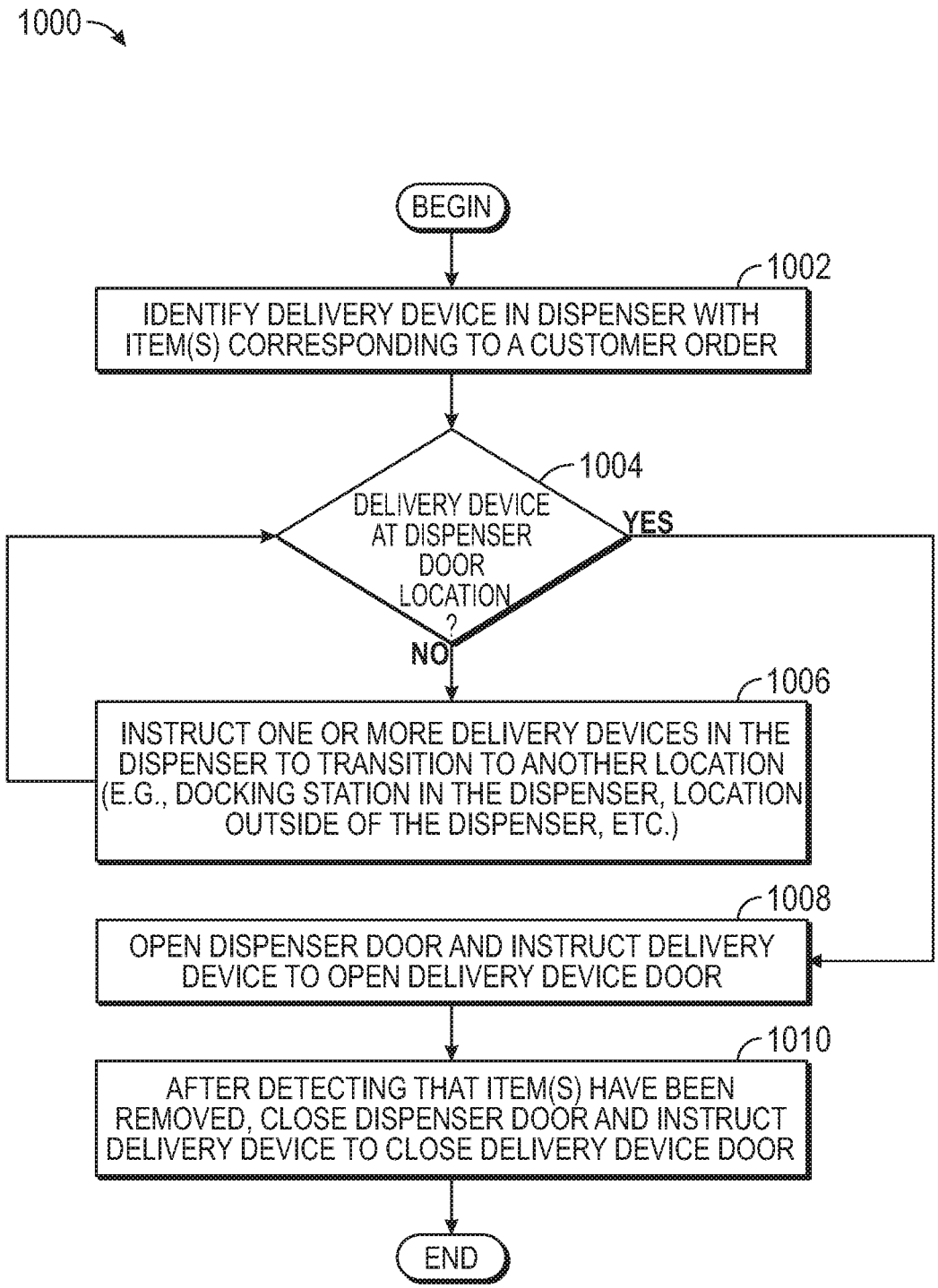
FIG. 10 is a flowchart of a method for controlling a dispenser located in a pickup area, according to one embodiment.

FIG. 10 is a flowchart of a method 1000 for controlling a dispenser (e.g., dispenser 110, 610, 810, 910, etc.) located in a pickup area, according to one embodiment. The method 1000 may be performed by a control system (e.g., control system 108) and/or one or more other components of the automated package retrieval system 100.

As shown, the method 1000 begins at block 1002, where the control system identifies a delivery device (e.g., delivery device 106) in a dispenser with one or more items corresponding to a customer order. At block 1004, the control system determines whether the delivery device is present at a door location of the dispenser. For example, the dispenser may include one or more access barriers (e.g., door, panels, etc.) at different locations. In one example, the dispenser may include access barriers that allow delivery devices to enter and exit the dispenser and/or access barriers at other locations that allow users to gain entry to delivery devices in the stations within the dispenser. In some cases, the dispenser may not include any access barriers that permit users to access delivery devices. In some cases, the dispenser may include a single access barrier that allows a user to access delivery devices.

If, at block 1004, the control system determines that the delivery device is not present at a door location of the dispenser, the control system instructs one or more delivery devices in the dispenser to transition to another location. In one example, the other location may be a different station (e.g., station 120) in the dispenser. In another example, the other location may be a location outside of the dispenser.

Assume, for example, that the door location of the dispenser is an access barrier (e.g., access barrier 622B) used by delivery devices to enter and exit the dispenser. Further assume that there are one or more other delivery devices between the door location and the delivery device of interest (e.g., the delivery device identified at block 1002). In this case, the control system may instruct the one or more other delivery devices and the delivery device of interest to exit the dispenser so that the user can gain access to the delivery device of interest.

In another example, assume that the door location of the dispenser is an access barrier (e.g., access barrier 628) above one of the stations and that there is at least one delivery device between the station and the delivery device of interest. In this case, the control system may instruct one or more of the other delivery devices to transition to a different station, so that the delivery device of interest can transition to the station beneath the access barrier. As noted, in some embodiments, the dispenser may have a configuration that allows the delivery devices to transition to different stations within the delivery device without exiting the dispenser.

One the control system determines that the delivery device (identified at block 1002) is at the dispenser door location, the control system opens the dispenser door and instructs the delivery device to open its door (block 1008). At block 1010, after detecting that the one or more items have been removed, the control system instructs the delivery device to close its door and closes the dispenser door. In some cases, the control system may additionally instruct delivery devices that have exited the dispenser (e.g., to allow the user to gain access to the delivery device identified at block 1002) to return to the dispenser.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., management system 280, controller 204, application 242) or related data available in the cloud. For example, the management system 280 could execute on a computing system in the cloud and control components of the automated package retrieval system 100 (e.g., dispenser 110, delivery devices 106, control system 108). Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A hub apparatus, comprising:
a support frame providing a plurality of docking locations for a plurality of delivery devices, wherein the support frame comprises a plurality of ramps that lead to one or more of the plurality of docking locations and wherein a first ramp of the plurality of ramps has a different inclination than a second ramp of the plurality of ramps;
a first plurality of guide rails attached to the support frame, wherein each of the first plurality of guide rails is attached to a different one of the plurality of ramps; and
a cover assembly that encloses the support frame and the first plurality of guide rails, wherein the cover assembly comprises (i) one or more first door units disposed at a first side of the cover assembly and adjacent to an entrance of one or more of the plurality of ramps at the first side of the cover assembly and (ii) one or more second door units disposed at a second side of the cover assembly and adjacent to an exit of one or more of the plurality of ramps at the second side of the cover assembly.

2. The hub apparatus of claim 1, wherein:
the first ramp leads to at least two docking locations of the plurality of docking locations at a first height and a first inclination; and
the second ramp leads to at least two docking locations of the plurality of docking locations at a second height, different from the first height, and a second inclination, different from the first inclination.

3. The hub apparatus of claim 1, further comprising one or more third door units disposed on a top side of the cover assembly and located above one or more of the plurality of docking locations.

4. The hub apparatus of claim 3, wherein:
the one or more third door units comprises a plurality of third door units; and
each third door unit of the plurality of third door units is located above a different one of the plurality of docking locations.

5. The hub apparatus of claim 3, wherein a number of the one or more third door units is less than a number of the plurality of docking locations.

6. The hub apparatus of claim 5, wherein the number of the one or more third door units is one.

7. The hub apparatus of claim 3, wherein the one or more third door units is fixed in an open position above the one or more of the plurality of docking locations.

8. The hub apparatus of claim 1, wherein each of the plurality of docking locations comprises a charging unit configured to charge a power module of a delivery device that is docked at the docking location.

9. The hub apparatus of claim 1, wherein the hub apparatus is located in a parking space used for parking a vehicle.

10. The hub apparatus of claim 1, wherein a first docking location of the plurality of docking locations has a different surface shape than a second docking location of the plurality of docking locations.

11. The hub apparatus of claim 1, further comprising one or more fiducial markers disposed on an inside surface of the cover assembly.

12. The hub apparatus of claim 1, further comprising a second plurality of guide rails, wherein each of the second plurality of guide rails is attached to a different one of the plurality of ramps.

13. The hub apparatus of claim 12, wherein:
each of the first plurality of guide rails is attached to a first side of a different one of the plurality of ramps; and
each of the second plurality of guide rails is attached to a second side of a different one of the plurality of ramps.

14. The hub apparatus of claim 1, further comprising:
a third door unit disposed on a top side of the cover assembly and adjacent to a first set of the plurality of docking locations accessible via the third door unit from a first side of the hub apparatus extending along a length of the plurality of ramps; and a fourth door unit disposed on the top side of the cover assembly and adjacent to a second set of the plurality of docking locations accessible via the fourth door unit from a second side of the hub apparatus extending along the length of the plurality of ramps.

15. A system comprising:

a hub apparatus comprising:

a support frame providing a plurality of docking locations of a plurality of delivery devices, wherein the support frame comprises a plurality of ramps that lead to one or more of the plurality of docking locations, wherein a first ramp of the plurality of ramps has a different inclination than a second ramp of the plurality of ramps, and wherein each of the plurality of docking locations comprises a charging unit configured to charge a power module of a delivery device that is docked at the docking location;

a plurality of guide rails attached to the support frame, wherein each of the plurality of guide rails is attached to a different one of the plurality of ramps; and a cover assembly that encloses the support frame and the plurality of guide rails, wherein the cover assembly comprises one or more first door units disposed at a first side of the cover assembly and adjacent to an entrance of one or more of the plurality of ramps at the first side of the cover assembly; and a controller configured to control an operation of the hub apparatus.

16. The system of claim 15, wherein the hub apparatus further comprises one or more second door units disposed on a top side of the cover assembly and located above one or more of the plurality of docking locations.

17. The system of claim 15, wherein the cover assembly further comprises one or more second door units disposed at a second side of the cover assembly and adjacent to an exit of the plurality of ramps at the second side.

18. A hub apparatus, comprising:

a support frame providing a plurality of docking locations for a plurality of delivery devices, wherein the support frame comprises a plurality of ramps that lead to one or more of the plurality of docking locations and wherein a first ramp of the plurality of rams has a different inclination than a second ramp of the plurality of ramps;

a first plurality of guide rails attached to the support frame, wherein each of the first plurality of guide rails is attached to a different one of the plurality of ramps;

a cover assembly that encloses the support frame and the first plurality of guide rails, wherein the cover assembly comprises one or more first door units disposed at a first side of the cover assembly and adjacent to an entrance of one or more of the plurality of ramps at the first side of the cover assembly; and one or more fiducial markers disposed on an inside surface of the cover assembly.

19. The hub apparatus of claim 18, further comprising one or more second door units disposed on a top side of the cover assembly and located above one or more of the plurality of docking locations.

20. The hub apparatus of claim 19, wherein a number of the one or more second door units is less than a number of the plurality of docking locations.

\* \* \* \* \*